Oct. 20, 1964 A. BRUEDER 3,153,425
CONTROL REGULATOR OF HYDRAULIC DEVICE FOR MAINTAINING
A VEHICLE FRAME TO A CONSTANT LEVEL
Filed March 3, 1959 2 Sheets-Sheet 1

United States Patent Office 3,153,425
Patented Oct. 20, 1964

3,153,425
CONTROL REGULATOR OF HYDRAULIC DEVICE FOR MAINTAINING A VEHICLE FRAME TO A CONSTANT LEVEL
Antoine Brueder, Paris, France, assignor to Societe Anonyme Andre Citroen, Paris, France
Filed Mar. 3, 1959, Ser. No. 796,857
Claims priority, application France, Apr. 10, 1958, 762,758, Patent 1,210,681
4 Claims. (Cl. 137—596.2)

In hydraulic suspension systems of vehicles it is known to incorporate devices adapted to maintain the frame of the vehicle at a constant level independently of load variations as well as of variations in the forces of inertia and in the relative directions of gravity which become alternately or simultaneously effective during the operation of the vehicle. These devices comprise, for each frame-supporting point of which the height or level must be kept at a constant value, a distributor for feeding this supporting point which is connected to the source and to the exhaust or outlet side of a compressed-fluid circuit, and a member for controlling this distributor which is responsive to the specific level or height of the relevant supporting point and adapted to open the communication between this distributor and the source or outlet when the level of this supporting point is higher or lower than a predetermined value to be maintained.

It is already known, for example as set forth in U.S. Patent No. 2,490,311, to actuate the control member from the frame-supporting point through the medium of a resilient or electromagnetic force and to retard its movements by means of a dash-pot disposed for example in the distributor itself and adapted to operate by using the fluid contained in this distributor.

In the aforesaid patent the dash-pot is described as operating by forcing the fluid through a small orifice of adjustable but constant cross-sectional area. The retarding force exerted on the control member is therefore constant in both directions of operation and this member is thus adapted to stop each corrective action in one direction with the same lag as that characterizing the correction itself. However, this mode of operation is normally attended by movements of excessive amplitude of the sprung portion of the vehicle.

Now, it is the object of this invention to provide a regulator for the control member of a hydraulic distributor, for the purpose of maintaining at a constant level the frame of a vehicle, which provides a force for retarding the movement of said member when the latter departs from its neutral position while permitting the free movement of this member when it moves back to this neutral position.

This regulator for the control member of a hydraulic distributor for maintaining at a constant height or level the frame of a vehicle, comprises a regulator member responsive to the control member and displaceable in a fluid on either side of a mean position by compressing this fluid in either of two chambers interconnected by a relatively narrow passage. The two chambers communicate, in addition, through a relatively wide passage and the end of said regulating member which faces on chamber co-acts with a spring-loaded auxiliary member to close the inlet to said wide passage when the regulating member departs from its mean position. Said auxiliary member uncovers said inlet and thereby opens said passage when the regulating member moves towards its mean position.

According to a specific form of embodiment of the present invention, the control member is immersed in the distributor fluid and engaged in a central element slidably mounted in a cylinder and disposed between two dashpot elements each formed with a longitudinal duct and also mounted for axial sliding movement in said cylinder on either side of the central element. These two dashpot elements are each urged by compression springs located in the two opposite bottoms of the cylinder towards positions in which they bear on shoulders formed in said cylinder. In these positions said dashpot elements are fixed (in the mean position of said control member) by contacting the central element.

The features and advantages of this invention will become more apparent from the following description given with reference to the accompanying drawings forming part of this specification and illustrating diagrammatically by way of example a few forms of embodiment of the invention. In the drawings:

FIGURES 1 and 2 show a hydraulic distributor of which the control member is actuated resiliently according to the design described in the aforesaid patent, this distributor being provided with a regulator according to this invention, shown in longitudinal section to illustrate the conditions obtaining respectively with the control member in its mean position, and with the control member in its shifted position.

Figure 1:
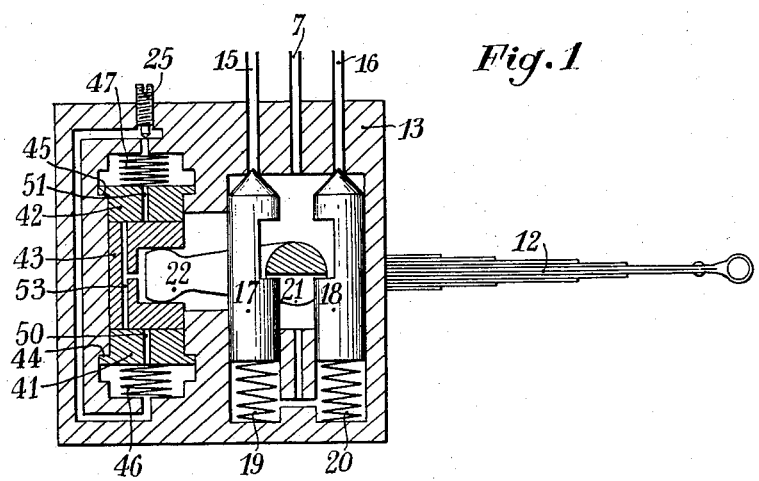
Figure 2:
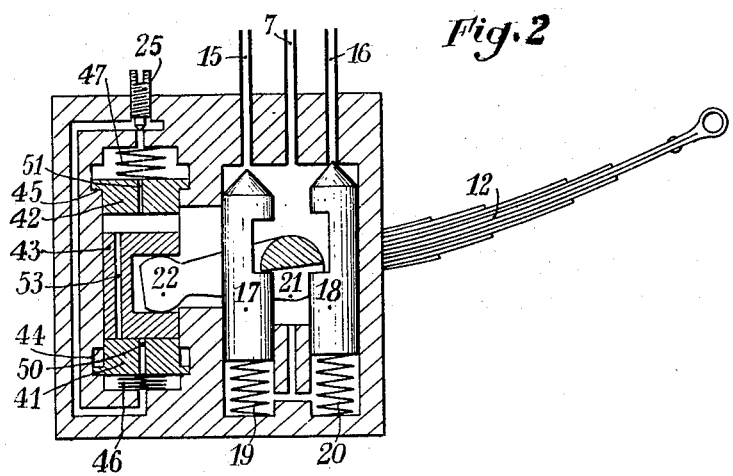

The distributor illustrated in FIGS. 1 and 2 of the drawings has the same general arrangement as that shown in FIG.1 of the Patent No. 2,490,311. It consists of a body 13 in which are slidably mounted two needle valves 17, 18 urged by springs 19, 20 to their positions in which they close valve ports communicating with pipe lines 15, 16. The angular displacement of the cylindrical shaft 21 about its axis unseats one or the other of these needle valves 17 or 18. To this end the shaft 21 is formed with a half-circular notch of which the diametral bottom is adapted to act like a cam on adequate notches formed in the valves. The pipe lines 15, 16 are connected the one to the source of compressed fluid and the other to the exhaust side of the fluid-distributing circuit of the vehicle. The intermediate pipe line 7 is adapted to supply fluid to the hydraulic support associated with the frame bearing point of which the height or level is to be maintained at a constant value by the distributor. In this arrangement the arm 22 is the control member responsive to the vertical displacement of the supporting point, with the interposition of an elastic member 12. In the arrangement shown in the aforesaid Patent No. 2,490,311 the free end of arm 22 engages a simple piston acting like a conventional-type dash-pot by sliding in a cylindrical casing. According to this invention, this single piston is replaced by three piston elements 41, 42, 43 formed with narrow passages 50, 51, 53 respectively. Pistons 41, 42 are pressed against fixed shoulders 44, 45 by springs 46, 47. The movements whereby the arm 22 tends to move the pistons 41 or 42 from their inoperative position shown in FIG. 1 take place when the arm 22 departs from its neutral position. During these movements the arm 22 urges piston 43 upwards or downwards and at the same time the piston 42 or 41 is similarly actuated from the corresponding abutment-forming shoulder. Therefore, these movements take place bodily for both pistons 43, 42 or 43, 41, and ducts 51, 53 or 50, 53 are thus prevented from communicating with each other. Consequently, the fluid must flow through the external, wider passage provided with flow-retarding means 25. Under these conditions, the mechanism requires a considerable time for departing from its neutral position. On the contrary, when the arm 22 is resiliently urged back to its neutral position, the piston 43 may resume this neutral position very rapidly due to the free flow of fluid through its passage 53, thus permitting the almost immediate re-closing of needle valve 17, so that the level-correcting movement is discontinued as soon as the interference has taken place. Under these conditions, there is no risk that the suspension system exceeds its normal momentary position, since the flow of fluid is discontinued immediately as the vehicle has attained its normal level.

Figure 3:
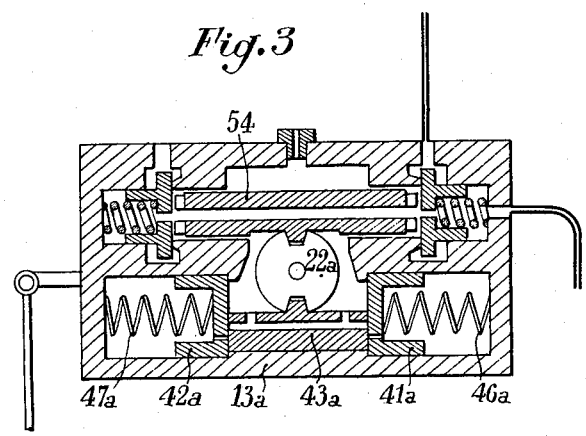
FIGURE 3 is a vertical section illustrating a hydraulic distributor of similar design and also provided with a regulator.

In the distributor illustrated in FIG. 3, the body 13a has mounted therein a control member in the form of a disk 22a formed with two diametrally opposite notches engaged by relevant teeth carried the one by the member 54 to be actuated for supplying fluid to the hydraulic support of the bearing point of the frame of which the level is to be adjusted, and the other by the central member 43a of the regulator which comprises in addition, in a manner similar to that shown in FIGS. 1 and 2, the two lateral elements 41a, 42a urged by compression springs 46a, 47a respectively.

Figure 4:
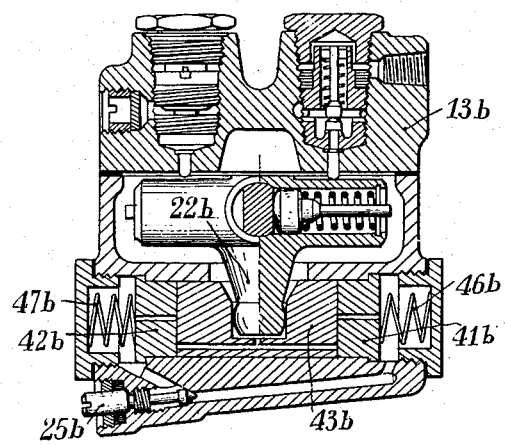
FIGURE 4 illustrates similarly the use of a regulator in another hydraulic distributor of similar design.

In the body 13b of the distributor illustrated in FIG. 4, the control member engages by means of a ball-headed shank 22b a cavity formed in the central element 43b of the regulator which comprises in addition the two lateral elements 41b and 42b urged by compression springs 46b and 47b respectively. There is also shown in section in this figure a narrow passage permitting the adjustable communication at 25b between the two opposite bottoms of the cylinder in which the three elements 41b, 42b and 43b are slidably mounted.

Figure 5:
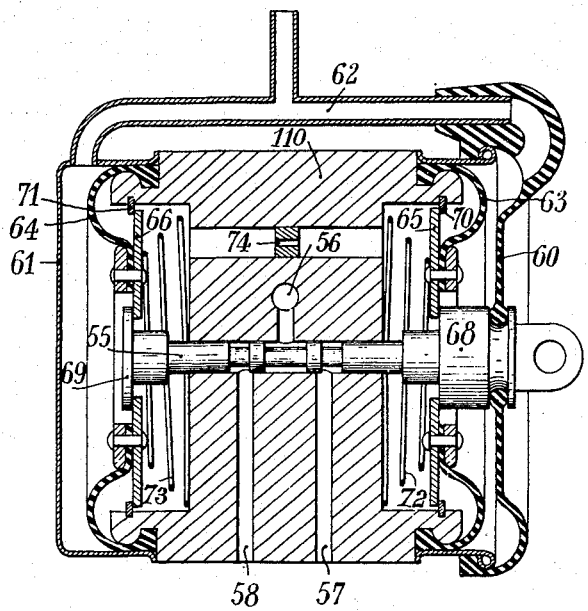
FIGURE 5 illustrates similarly the use of a regulator in a hydraulic distributor also of the type comprising a resiliently actuated control member of a different type, such as described in the U.S. Patent No. 2,757,376.

In the hydraulic distributor of FIG. 5 which is of the general type illustrated and described in the U.S. Patent No. 2,757,376, the control member responsive to resilient transmission means consists of a slide valve 55 of which the displacements in the right-hand or left-hand direction opens valve ports to cause the pipe line 56 to communicate either with the pipe line 57 leading from the pressure accumulator, or with the pipe line 58 constituting the return way to the reservoir in the compressed-fluid circuit (not shown) of the vehicle. According to this invention, the distributor comprises, in addition, on either side of its body 110 two walls 60, 61 forming two lateral chambers interconnected by a duct 62. The chamber portions adjacent to the body 110 are separated from the ends by resilient annular diaphragms 63, 64 of which the inner contours carry on their faces turned towards the body 110 a pair of washers 65, 66 engaging on their outer sides a pair of shoulders or like annular projections 68, 69 consisting of collars carried by the two ends of slide valve 55. When one of these shoulders 68, 69 is pushed inwards relative to its mean position shown in the drawing, it engages the relevant washer 65 or 66, whereas when the same shoulder 68 or 69 is pulled outwards it moves away from this washer 65 or 66 which is then rigidly held in position, in spite of the resiliency of the annular diaphragm 63 or 64, by a stop ring 70 or 71 fitted in a groove of the body 110. Housed in the compartments of the two chambers adjacent to the body 110 are two compression springs 72, 73 bearing on the body 110 and urging the washers 65, 66 outwards. These two compartments of the two chambers communicate with each other through a duct extending longitudinally through the body 110 and comprising a narrow orifice 74. Thus, when the slide valve 55 moves for example to the right, that is from neutral to inlet, the fluid is retarded by the gaged orifice 74 and flows between washer 65 and shoulder 68 which have moved away from each other, washer 65 being retained by the stop ring 70. The fluid then flows through duct 62 to the end of the opposite chamber. On the contrary, when the slide valve 55 moves to the left for resuming its neutral position, the shoulder 69 is separated from washer 66 and permits the quick filling of the adjacent chamber of the body until the neutral position is attained.

While preferred embodiments of the invention have been herein described by way of example, it will be understood that the invention is not limited to these embodiments.

What I claim is:

1. A hydraulic distributor comprising a body through which extends longitudinally a cylindrical passage into which lead three ducts formed radially in said body, the first duct communicating with a load line and the second and third ducts communicating respectively with a source of compressed fluid and with an exhaust port, said body having formed therein a pair of lateral recesses each bounded on the one hand by a circular bottom, said cylindrical passage of said body opening into the center of the circular bottom of each recess, and on the other hand by an inner cylindrical wall co-axial with said cylindrical passage and ending with a circular edge of each recess, said pair of lateral recesses in said body communicating with each other through a narrow passage formed longitudinally through said body, a slide valve mounted in said cylindrical passage of said body and having its ends projecting from either side of said body through the circular bottoms of the recesses, said slide valve ends being formed with shoulders each registering with the circular bottom of each of said lateral recesses of said body, a pair of annular diaphragms having on the one hand peripheral edges rigidly secured on either side of said body around said circular edges of said lateral recesses of said body and on the other hand inner circular edges of a diameter greater than that of said slide valve shoulders, a pair of rigid rings secured against said inner circular edges of said diaphragms and registering with said bottoms of said lateral recesses of said body respectively, said rings having peripheral edges adjacent to the inner cylindrical walls of said lateral recesses of said body and inner circular edges disposed between said shoulders of said slide valve, a pair of circular shoulders in the inner cylindrical walls of said lateral recesses of said body to limit the movement of said rings away from the bottoms of said lateral recesses, a pair of springs reacting on the bottoms of said lateral recesses of said body and urging said rigid rings for engagement with said circular shoulders in said inner cylindrical walls of said lateral recesses of said body, a pair of closure members having circular peripheral edges rigidly secured on either side of said body about the circular peripheral edges of said annular diaphragms and forming two closed spaces on either side of said body, and a pipe line interconnecting said closed spaces and having a branch element leading to a reservoir filling said closed spaces with liquid, said slide valve being resiliently actuated for sliding movement in said cylindrical passage of said body on either side of an intermediate position in which said second and third ducts of the body are closed, and wherein said rigid rings, due to the action of said springs, engage simultaneously, with their peripheral edges, said shoulders in said inner cylindrical walls of said lateral recesses in said body and, with their inner circular edges, the shoulders of said slide valve.

2. A hydraulic distributor comprising a body through which extends a cylindrical bore with recesses at opposite ends of said bore, a central piston element movable longitudinally in said bore, valve means comprising two valve ports and means movable with said piston element to close both valve ports when said piston element is in an intermediate position, to open one of said valve ports when said piston element moves in one direction from said intermediate position and to open the other of said valve ports when said piston element moves in the opposite direction from said intermediate position, a dashpot element disposed in each of said recesses and cooperating with the respective recess to define a chamber containing liquid, said dashpot elements being movable in the direction of movement of said piston element to vary the volume of the respective chamber, each of said dashpot elements having a passage therethrough, first passageway means comprising said passages through said dashpot elements and a communicating passageway connecting said chambers with one another, second passageway means including a gauged restriction connecting said chambers with one another, flow through said second passageway means being materially restricted relative to flow through said first passageway means, said piston element upon movement away from said intermediate position being engageable with one of said dashpot elements to move said one dashpot element in a direction to reduce the volume of the corresponding chamber and to close the passage through said one dashpot element whereby liquid can flow from said corresponding chamber only through said second passageway means thereby restricting movement of said piston element and said one dashpot element according to said gauged restriction, said piston element upon return movement toward said intermediate position disengaging said dashpot element and thereby opening said passage through said dashpot element to permit liquid to return to said chamber through both of said passageway means, means biasing said dashpot elements toward the position they occupy when said piston element is in said intermediate position, and stop means limiting movement of said dashpot elements by said biasing means beyond said positions corresponding to said intermediate position of the piston element.

3. A hydraulic distributor according to claim 2, in which said dashpot elements comprise pistons and said passages comprise ducts extending lengthwise through said pistons between the ends thereof and in which said first passageway means comprises said ducts and a duct which extends lengthwise through said central piston element between the ends thereof and is out of line with said ducts in said dashpot elements whereby said ducts are out of communication with one another when said central piston element is in engagement with said dashpot elements.

4. A hydraulic distributor according to claim 2, in which said gauged restriction in said second passageway means comprises means selectively restricting flow of fluid through said second passageway means.

References Cited in the file of this patent

UNITED STATES PATENTS

| | | |
|---|---|---|
| 2,490,311 | Levesque du Rostu | Dec. 6, 1949 |
| 2,652,848 | Wick et al. | Sept. 22, 1953 |
| 2,665,251 | Mendenhall | Jan. 5, 1954 |
| 2,670,201 | Rossman | Feb. 23, 1954 |
| 2,757,376 | Brueder | July 31, 1956 |
| 2,905,462 | Christensen | Sept. 22, 1959 |
| 2,911,230 | Peras | Nov. 13, 1959 |
| 2,918,303 | Brown | Dec. 22, 1959 |
| 2,938,736 | Brown | May 31, 1960 |
| 2,945,700 | Polhemus et al. | July 19, 1960 |

FOREIGN PATENTS

| | | |
|---|---|---|
| 948,119 | Germany | Aug. 30, 1956 |